(12) United States Patent
Klyce

(10) Patent No.: US 6,354,931 B1
(45) Date of Patent: Mar. 12, 2002

(54) APPARATUS AND METHOD FOR BALLOONING COOKED MEAT STICKS

(75) Inventor: Thomas A. Klyce, Memphis, TN (US)

(73) Assignee: Ranger Tool Co., Inc., Bartlett, TN (US)

( * ) Notice: Subject to any disclaimer, the term of this patent is extended or adjusted under 35 U.S.C. 154(b) by 0 days.

(21) Appl. No.: 09/489,400

(22) Filed: Jan. 21, 2000

(51) Int. Cl.[7] .............................................. A22C 11/00
(52) U.S. Cl. ....................................................... 452/50
(58) Field of Search ................................... 452/50, 51

(56) References Cited

U.S. PATENT DOCUMENTS

| | | | |
|---|---|---|---|
| 2,340,755 A | * | 2/1944 | Jacobbson ................... 452/50 |
| 2,369,360 A | | 2/1945 | Martin |
| 2,757,409 A | * | 8/1956 | Parkes et al. ................. 452/50 |
| 2,757,410 A | * | 8/1956 | Cline ........................... 452/50 |
| 2,954,379 A | | 10/1960 | Menghini |
| 3,055,045 A | | 9/1962 | Brendle et al. |
| 3,312,995 A | | 4/1967 | Garey |
| 3,487,499 A | | 1/1970 | Klyce |
| 4,118,828 A | | 10/1978 | Melanson |
| 4,124,919 A | | 11/1978 | Klyce |
| 4,414,707 A | | 11/1983 | Koken |
| 4,637,095 A | | 1/1987 | Maruska |
| 4,682,387 A | | 7/1987 | Leining |
| 5,184,541 A | | 2/1993 | Klyce ........................... 99/472 |
| 5,246,395 A | | 9/1993 | Zirps et al. ................... 452/50 |
| 5,295,895 A | | 3/1994 | Klyce et al. .................. 452/50 |
| 5,649,858 A | | 7/1997 | Williams et al. .............. 452/50 |

FOREIGN PATENT DOCUMENTS

| | | | | |
|---|---|---|---|---|
| GB | 271223 | * | 5/1927 | ................. 452/129 |

* cited by examiner

*Primary Examiner*—Peter M. Poon
*Assistant Examiner*—Floris C Copier

(57) ABSTRACT

An apparatus and method for ballooning and peeling the casing of a cooked meat stick such as cured pepperoni. Prior to peeling the casing from the meat stick, a needle pierces the casing and air is then injected through the needle and between the casing and the meat kernel therewithin so as to ballooningly separate the casing from the meat kernel. A gripper, preferably using jaws, grip one end of the casing and hold the casing to a casing drum. The casing is split longitudinally by a knife, and, as the casing drum rotates, the casing is wound onto the casing drum and forcibly pulled from the cooked meat stick. After the casing has been fully wound onto the casing drum and thus removed from the meat stick, the gripping jaws release the casing and a casing ejector slides the wound casing from the casing drum. A position detector is used to sense when the casing drum is in the correct rotational position to have the gripper grab the next cooked meat stick's casing end, and a brake slows and stops the rotation of the casing drum in the correct home position.

21 Claims, 6 Drawing Sheets

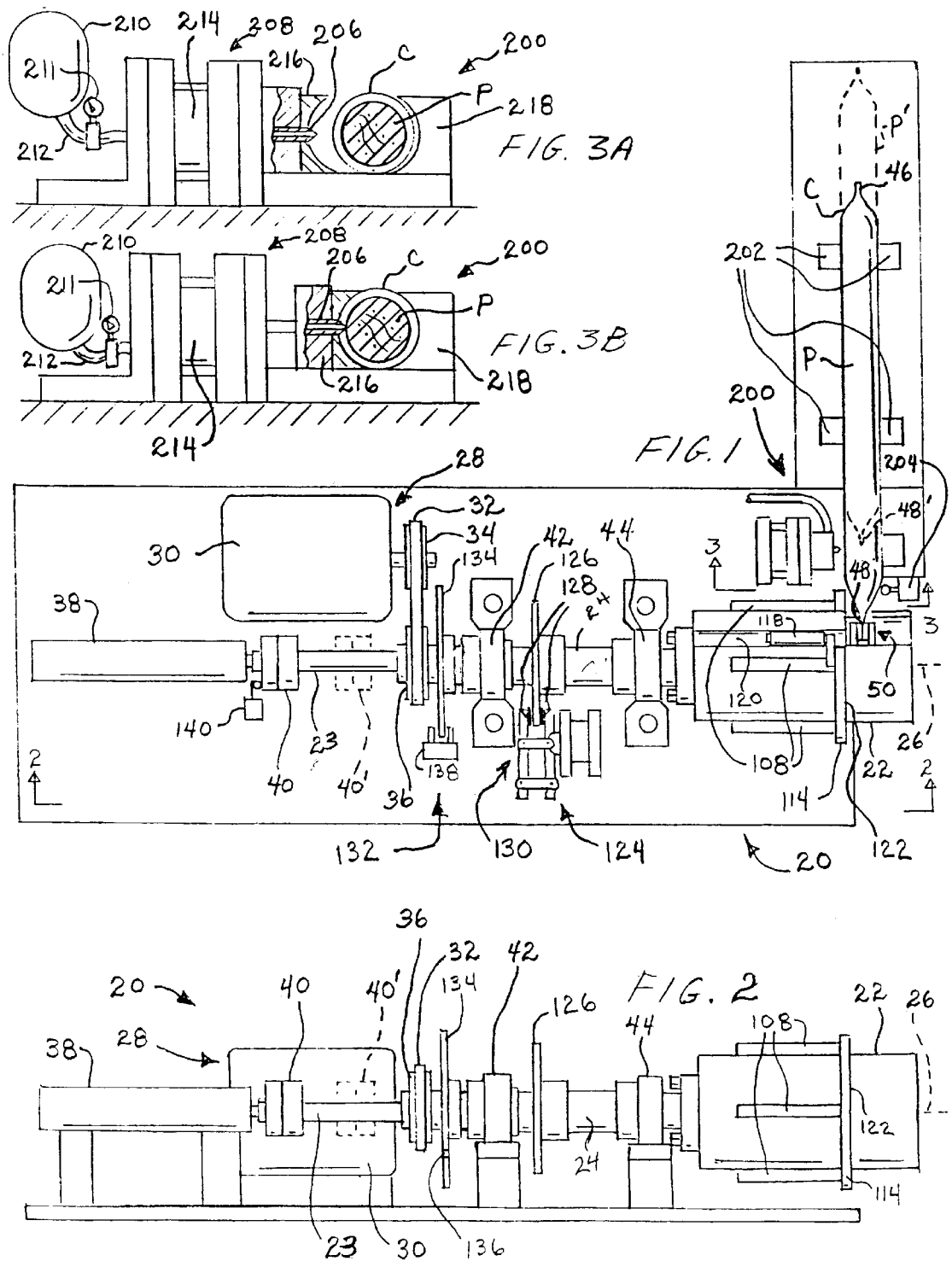

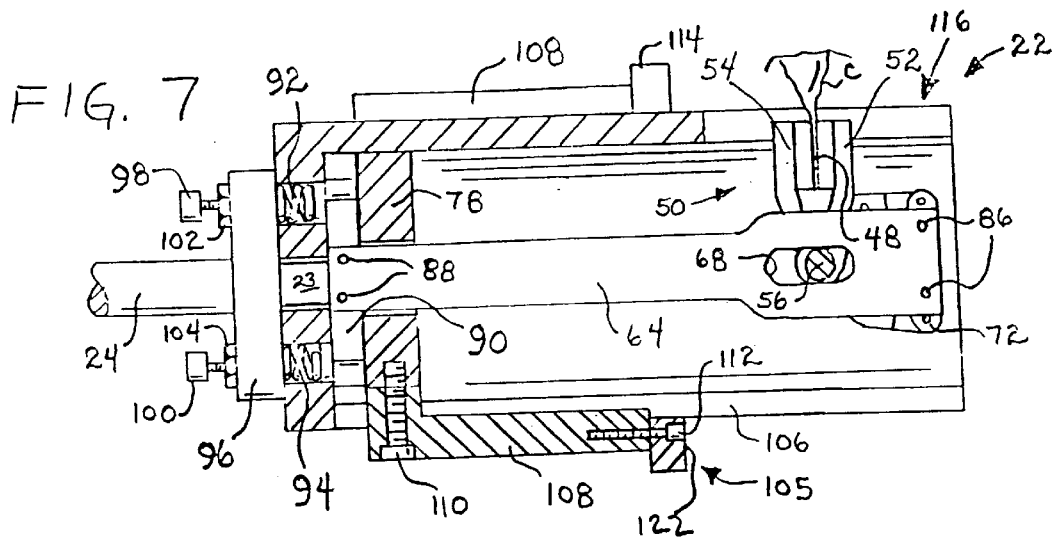
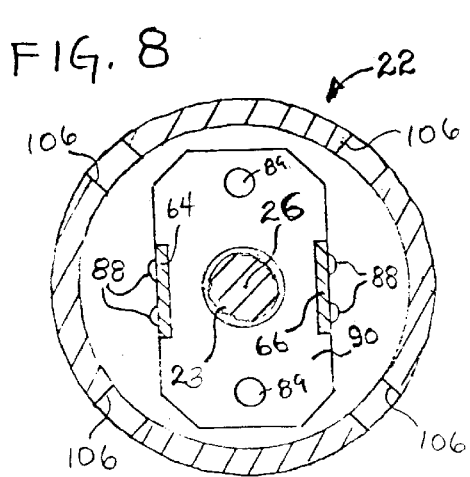
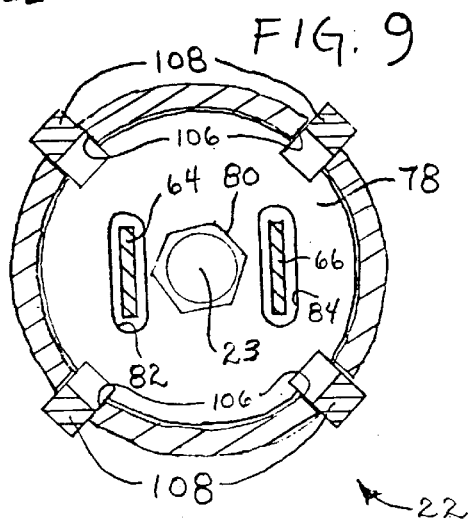
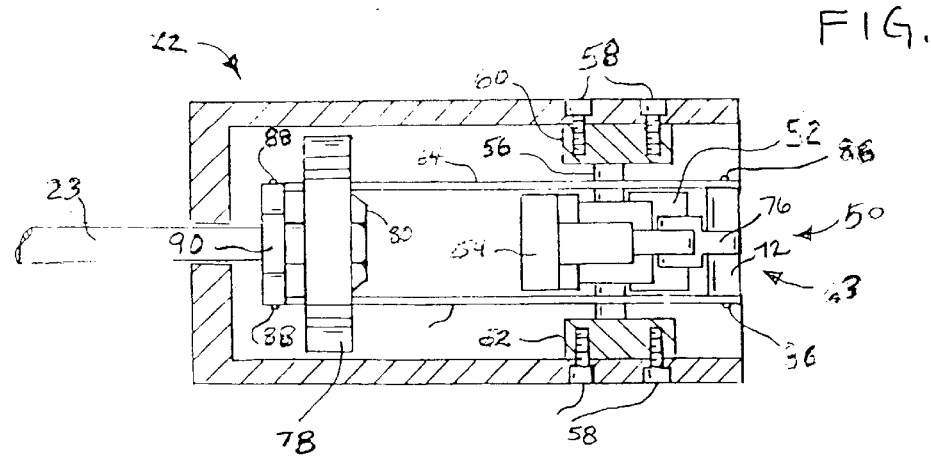

APPARATUS AND METHOD FOR BALLOONING COOKED MEAT STICKS

BACKGROUND OF THE INVENTION

1. Field of the Invention

The present invention relates, in general, to apparatus and methods for removing the skins and casings from meat products, and in particular, to an apparatus and methods for removing the skins and casings from cooked meat sticks such as cured cooked sticks of pepperoni.

2. Description of Related Art

Meat products producd in stick form, such as pepperoni sausages, are traditionally formed in a stuffing operation in which the sausage emulsion is stuffed into a skin or casing, such as a plastic or cellulose casing. The sausage stuffed casings may then be clipped, smoked, and further processed until the sausage is completely formed. After a sausage is formed, the casing is often removed to permit slicing of the sausage sticks for sale to consumers or institutions.

It is often desired to remove the skins and cellulose casings from stick-type meat products such as wieners, frankfurters, and pepperoni to permit repackaging or further processing of the products. Prior art solutions for this problem include slitting the skin or casing in which the meat product was cooked and then using air nozzles, steam, and vacuum to peel the encased meat from the outer casing. Removal of casings from frankfurter links and wiener links is rather straightforward, as taught, for example, in Klyce et al., U.S. Pat. No. 5,295,895, because such meat products are processed to allow the captive meat sticks or kernels to float or slip inside their cellulose casings.

However, such prior art methods may be inadequate to remove the casing from larger stick-type cured meats such as pepperoni, where the curing cycle causes the casing to strongly adhere to the meat stick, thereby causing great difficulty in removing the casing from the meat stick. Additionally, while steam processing has been used to remove the skins from wieners and frankfurters, such steam processing adds expense and complexity and is often unacceptable with large stick-type meat products and cured meat products. As a result, cured meat products such as five-foot (1.5 meter) long sticks of pepperoni have traditionally been peeled by hand using a knife.

It is therefore desirable, have an automated and high-throughput apparatus and method for removing the casing from cooked meat sticks and especially from cooked cured meat sticks such as sticks of pepperoni.

BRIEF SUMMARY OF THE INVENTION

The present invention is an apparatus and method for ballooning and peeling the casing of a meat stick such as cooked or cured pepperoni. Prior to peeling the casing from the meat stick, the casing may be "ballooned" by piercing the casing with a needle and injecting air through the needle between the casing and the meat kernel to separate the casing from the meat kernel. Grippers grip one end of the casing and hold the casing for rotation about a casing drum. The casing is split longitudinally by a knife, and, as the casing drum rotates, the casing is wound onto the casing drum and forcibly pulled from the meat stick. After the casing has been fully wound onto the casing drum and thus removed from the meat stick, the gripper and/or gripping means releases the casing and a casing ejector removes the wound casing from the casing drum. A home position detector may be used to sense when the casing drum is in the correct rotational position to have the gripper device grab the next cooked meat stick's casing end, and a brake may slow and stop the rotation of the casing drum in a desired position, such as the home position.

It is an object of the present invention to provide an apparatus and method for ballooning and peeling the casing of a cooked meat stick, such as cured pepperoni.

It is a further object of the present invention to peel the casing from the meat stick by providing more stripping power and force for removing the casing than heretofore possible using apparatus and methods of the prior art.

It is a still further object of the present invention to provide a higher-throughput automated apparatus and method for removing the casing from a cooked meat stick than heretofore possible, without requiring the use of steam to separate the casing from the meat stick.

It is yet another object of the present invention to facilitate the handling and disposal of casing waste products.

BRIEF DESCRIPTION OF THE SEVERAL VIEWS OF THE DRAWING

FIG. 1 is a top plan view of the peeling apparatus and ballooning apparatus of the present invention.

FIG. 2 is a side view of the peeling apparatus of the present invention, taken substantially along the line 2—2 shown in, FIG. 1, but with the brake calipers and the home position index sensor removed to show structure that would otherwise be hidden.

FIG. 3A is a sectional view of the ballooning apparatus of the present invention taken substantially along the line 3—3 shown in FIG. 1, showing the hollow needle prior to penetration of the casing of the meat stick.

FIG. 3B is a sectional view of the ballooning apparatus of the present invention, similar to FIG. 3A but showing the hollow needle penetrating the casing of the meat stick.

FIG. 7 is a longitudinal sectional view of the casing drum of the present invention, somewhat similar to FIG. 6 but with the casing ejector shown in the gripping position.

FIG. 8 is a transverse sectional view of the casing drum of the present invention, taken substantially along the line 8—8 shown in FIG. 5.

FIG. 9 is a transverse section view of the casing drum of the present invention, taken substantially along the line 9—9, shown in FIG. 6.

FIG. 10 is a longitudinal sectional view of the casing drum of the present invention as viewed from below the gripper.

DETAILED DESCRIPTION OF THE INVENTION

Figure 4:
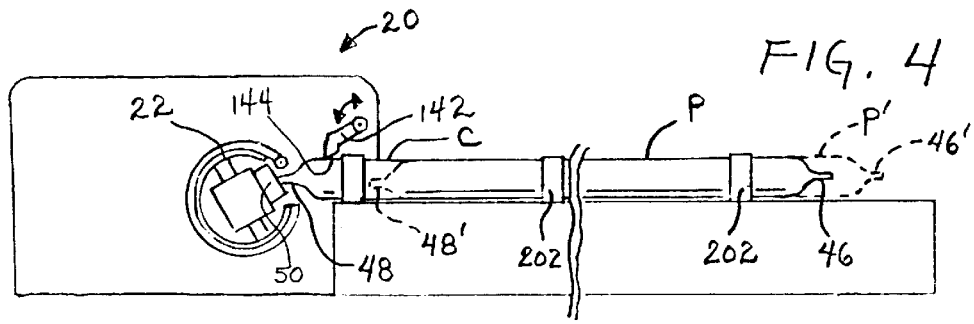
FIG. 4 is an end view of the peeling apparatus and ballooning apparatus of the present invention showing the gripping and slitting of the casing of the meat stick.

Referring to FIG. 1, the preferred embodiment of peeling apparatus 20 is seen to comprise a casing drum 22 mounted for rotation upon an axle or drive shaft 24 that defines an axis 26 of rotation. Rotation of the drive shaft 24 could be accomplished by any of a number of powered rotation devices 28 for rotating the casing drum 22 but is preferably accomplished by an electric motor 30 coupled to a drive shaft 24 by a drive belt 32 that encircles and engages a drive pulley 34 on the shaft of the motor 30 and a driven pulley 36 coupled to the drive shaft 24 so as to cause mutual rotation of the drive pulley 34 with the driven pulley 36. The drive shaft 24 is mounted for rotation by a pair of pillow-block bearings 42, 44.

A reciprocating shaft 23 reciprocates in response to action of an air cylinder 38, whose reciprocating piston is coupled to the reciprocating shaft 23 through a rotational coupling 40, thereby allowing the reciprocating shaft 23 to reciprocate longitudinally from a first position shown in FIGS. 1 and 2 to reciprocated positions as indicated, for example, by a rotational coupling 40 being shown in one such reciprocated position in dotted outline 40' in FIGS. 1 and 2. In order to permit independent rotation of the drive shaft, 24 and reciprocation of the reciprocating shaft 23, the driven pulley 36 is preferably coupled to the drive shaft 24 so that the driven pulley 36 may rotate the drive shaft 24 and while permitting reciprocation of the reciprocating shaft 23, preferably within the center of the drive shaft 24.

Referring especially to FIGS. 1 and 4, large stick-type meat products such as a pepperoni stick P have a cellulose casing C covering the cured and processed meat kernel within. Typically, each end 46, 48 of the pepperoni stick P is either tied or secured with a metal clip, leaving about a 1.5 inch (3.8 cm) tab protruding from each end 46, 48 of the pepperoni stick. It should be understood that, in FIGS. 1 and 4, reference numerals 46', 48', and P are used to indicate, by dotted outline, the position of the corresponding portions of the pepperoni stick prior to movement into the positions shown in solid outline. It should also be understood that pepperoni sticks are used as an exemplary meat product processed by the present invention, but that other stick-type meat products having casings, most typically relatively hard or firm stick-type products with difficult-to remove casings, may be peeled by the apparatus and method of the present invention.

Figure 11:
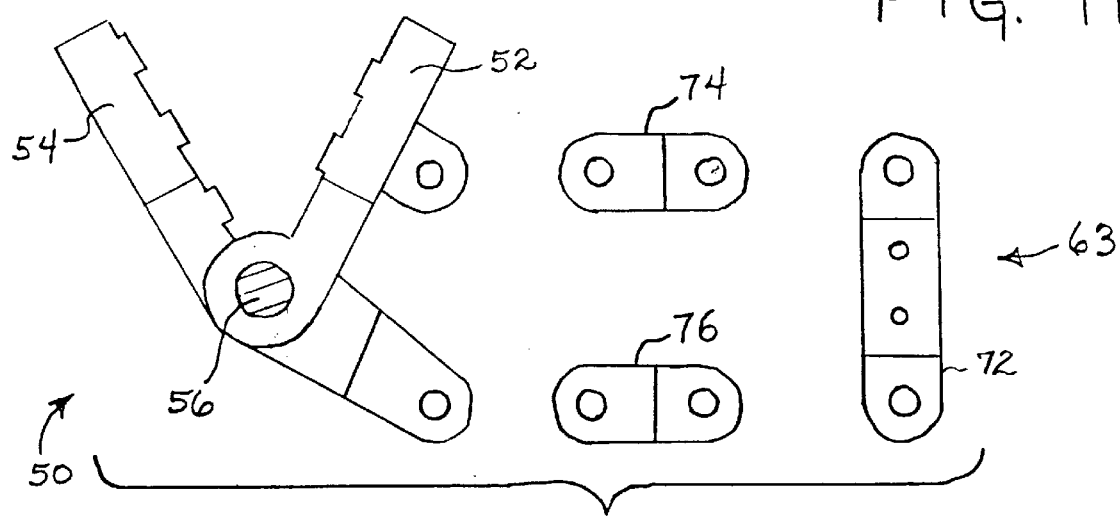
FIG. 11 is a side view of the parts of the linkages of the gripper.
Figure 12:
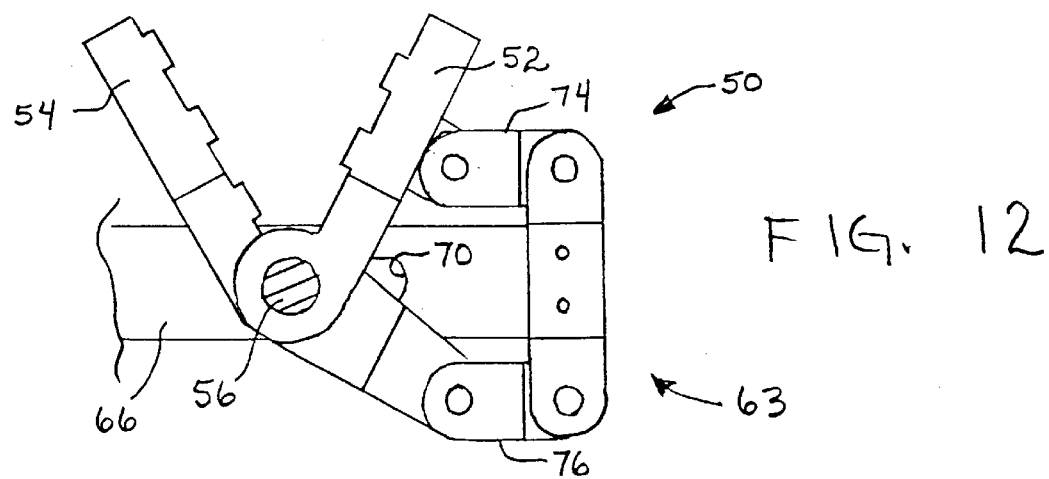
FIG. 12 is a side view of the gripper with the jaws opened.
Figure 13:
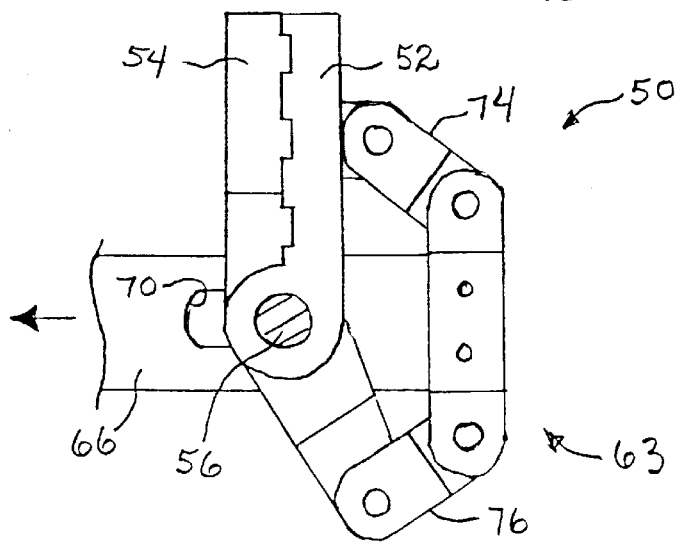
FIG. 13 is a side view of the gripper with the jaws closed.

Referring especially to FIGS. 5–13, peeling apparatus 20 further includes a holder for selectively holding a portion of the casing C, preferably the tab at the leading end 48 of pepperoni stick P, to the casing drum 22 such as the clamp 50, illustrated. The clamp 50 preferably comprises first and second opposed jaws 52, 54 mounted for movement upon a pivot pin 56 that is fixedly secured within the casing drum 22 as by screws 58 that secure pivot pin mounting blocks 60, 62 to the casing drum 22 as shown in FIG. 10. As shown in FIGS. 11–13, opposed jaws 52, 54 preferably may have matingly interlocking teeth on the contacting jaw faces to better entrappingly grab and grip the casing or the leading end 48 of the pepperoni stick P.

Opposed jaws 52, 54 may be opened and closed by a linkage mechanism 63 that operates in response to the reciprocation of lateral straps 64, 66 in a manner fully explained in detail hereinbelow. Oblong slots 68, 70 are respectively provided through the lateral straps 64, 66 to allow the lateral straps 64, 66 to reciprocate with respect to the pivot pin 56. It shall be understood that, for purposes of explanation and to better view the operation of linkage mechanism 63, the lateral strap 64 is removed from the views shown in FIGS. 12 and 13. Additionally, other systems known in the art could be utilized to actuate the jaws 52, 54.

Referring especially to FIGS. 10–13, the linkage mechanism 63 can now be explained. An end link 72 is pivotally joined at its ends to first ends of Y-shaped upper and lower intermediate links 74, 76 which, in turn, are respectively pivotally joined at their second opposite ends to the first and second opposed jaws 52, 54. End link 72 may be mutually reciprocated together with lateral straps 64, 66 with respect to pivot pin 56, as best seen by comparing FIG. 12 with FIG. 13, to open and close jaws 52 and 54.

As best seen in FIGS. 9 and 10, the reciprocating shaft 23 may be fixedly secured to a drum rotation disk 78 by a bolt 80 so that the drum rotation disk 78 is caused to reciprocate with the reciprocating shaft 23. The drum rotation disk 78 preferably has oblong slots 82, 84 for respective passage therethrough of the lateral straps 64, 66 and for allowing the drum rotation disk 78 to reciprocate with respect to lateral straps 64, 66.

As best seen in FIGS. 5–10, the lateral straps 64, 66 may each be secured at one end to an end link 72 as by screws 86 and at the opposite end by screws 88 to a jaw actuation member 90. It will be understood that, as the jaw actuation member 90 is caused to reciprocate with respect to the pivot pin 56, the coupling through lateral straps 64, 66 to the end link 72 causes the jaws 52, 54 to open and close.

Figure 5:
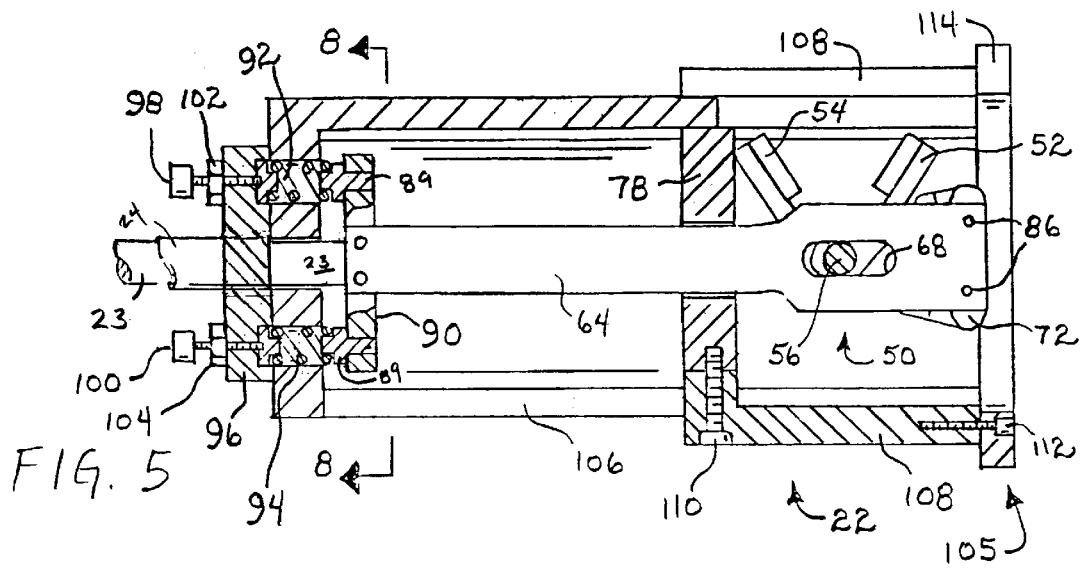
FIG. 5 is a longitudinal sectional view of the casing drum of the present invention, taken substantially along the line 5—5 shown in FIG. 16, showing the details of the gripper, with the casing ejector shown in the ejection pre-grip position.
Figure 6:
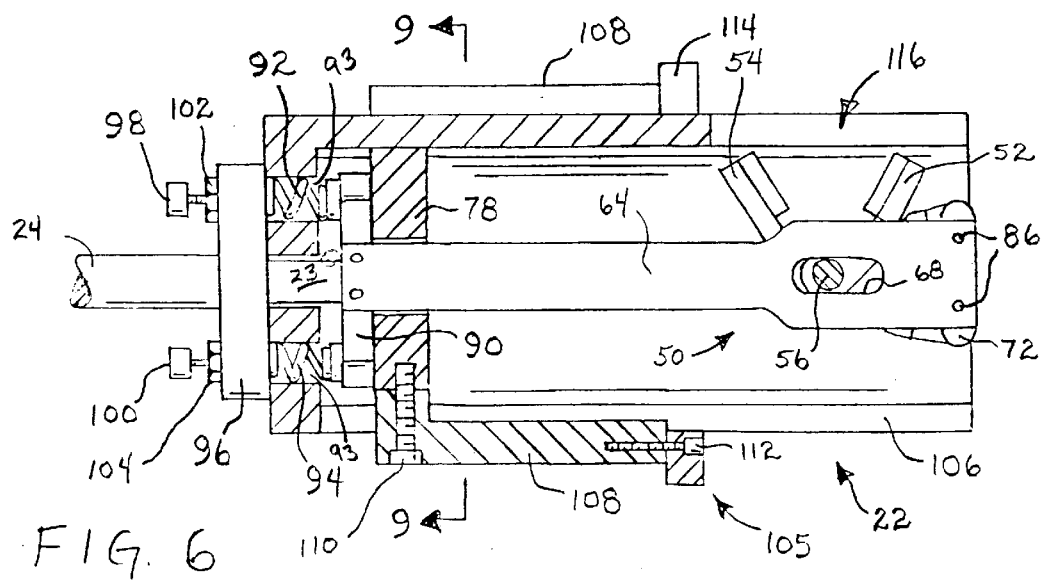
FIG. 6 is a longitudinal sectional view of the casing drum of the present invention, somewhat similar to FIG. 5 but with the casing ejector shown in an intermediate position.

FIGS. 5–7 also illustrate the relationship of the drive shaft to the reciprocating shaft 23. The drive shaft 24 is preferably operatively coupled to the casing drum 22 to rotate the casing drum 22. The drive shaft 24 may be connected to the rear of the casing drum 22 by a flange member such as rear plate 96 which may be bolted or otherwise connected to the casing drum 22.

FIG. 7 illustrates the reciprocating shaft 23 located within the drive shaft 24 24. FIG. 1 and 2 show the opposite end of reciprocating shaft 23 connected at one end to the reciprocating piston of the air cylinder 38 at the rotational coupling 40. When the drive shaft 24 rotates, the rotational coupling 40 preferably allows the reciprocating shaft 23 to rotate with the drive shaft 24.

Referring to FIGS. 5–7, the jaw actuation member 90 is shown resting against a plurality of springs 92, 94 entrapped within bores 93 through the endwall of the casing drum 22. As illustrated, one end of springs 92, 94 rests against receivers, such as guide plugs 89, located on the jaw actuation member 90 and the other end of springs 92, 94 resting against a rear plate 96 secured to the endwall of the casing drum 22. The plugs 89 may be received within the bores 93 when the jaws 52, 54 are in a closed position to provide additional torsional strength to the holder during rotation of the casing drum 22. Through this construction, the jaws 52, 54 may be spring loaded into the open position by springs 92, 94. Adjustment screws 98, 100, with respective locking nuts 102, 104, may also be utilized to allow the force exerted by the springs 92, 94 to be adjusted.

The preferred operation of an ejector 105 and the clamp 50 is illustrated in FIGS. 5–7. In FIG. 5, the reciprocating shaft 23 is shown extending substantially into the casing drum 22 thereby positioning the ejector 105 is in an ejecting position. The end of the reciprocating shaft 23 is preferably connected to the drum rotation disk 78 which is in turn connected to the ejector ring 114. As the reciprocating shaft 23 is partially withdrawn, it results in the drum rotation disk 78 moving toward the rear of the casing drum 22 with the reciprocating shaft 23. The ejector ring 114 moves to the position illustrated in FIG. 6 with the partial withdrawal of the reciprocating shaft 23. At least a portion of the drum rotation disk 78 is illustrated cooperating with the jaw actuation member 90 to operatively engage the jaw actuation member 90 such that further reciprocation of the reciprocating shaft 23 moves the jaw actuation member 90 to compress springs 92, 94 and move lateral slats 64, 66 rearward as is illustrated in FIG. 7. As described above, rearward movement of lateral slats 64, 66 relative to pivot pin 56 causes the jaws 52, 54 to shut.

Figure 14:
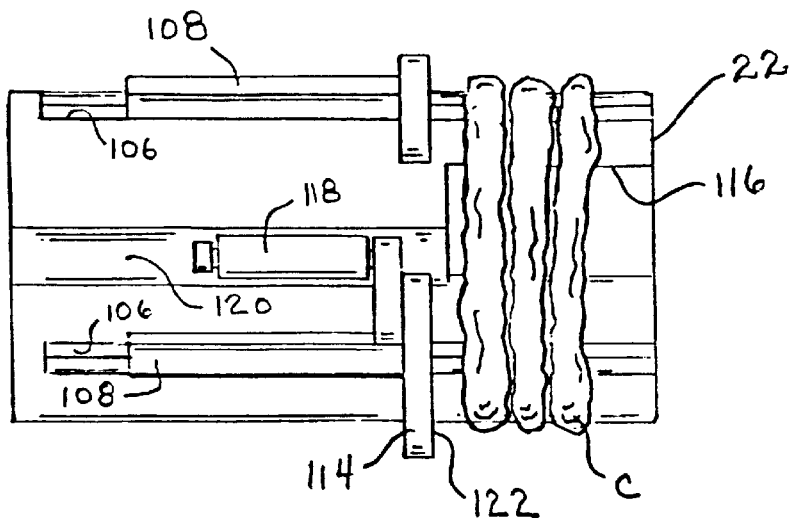
FIG. 14 is a top view of the casing drum of the present invention showing casing wound thereon and with the casing ejector shown in an intermediate position.
Figure 15:
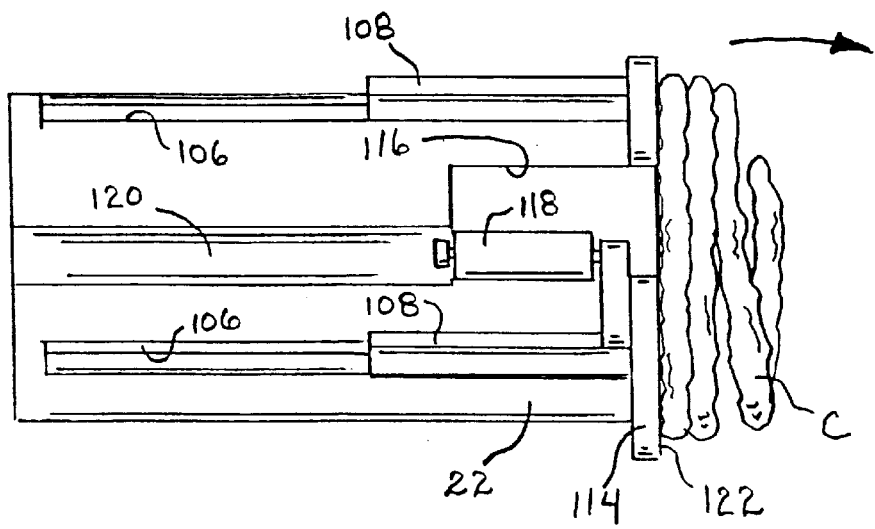
FIG. 15 is a top view of the casing drum of the present invention with the casing ejector shown in the ejection pre-grip position.
Figure 17:
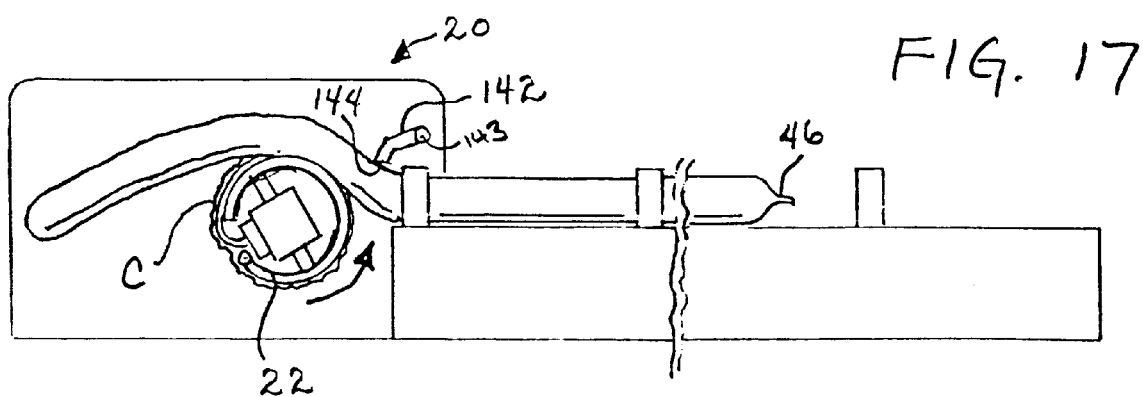
FIG. 17 is an end view of the peeling apparatus and ballooning apparatus of the present invention, similar to FIG. 4, but after an initial revolution of the casing drum and showing the winding of the casing thereon.

As hereinafter described in detail and as shown in FIGS. 14 and 17, after securing the casing C at holder 50, casing C is removed from the pepperoni stick P by winding the casing C upon rotating casing drum 22 by as the pepperoni stick P passes transversely over the rotating casing drum 22. Referring to FIGS. 14 and 15, once the casing C has been removed from the pepperoni stick P and wound upon the casing drum.22, the wound casing C is then preferably ejected from casing drum 22 by a casing ejector 105, in a manner that will now be described. The casing drum 22 may have a plurality, preferably four, of longitudinal slots 106 within which a like number of respective radially-extending casing ejector ribs 108 reciprocate. Each of the casing ejector ribs 108 may be secured to the drum rotation disk 78 by a screw 110 so as to cause mutual rotation and/or reciprocation of casing ejector ribs 108 with drum rotation disk 78, thereby causing mutual rotation of casing drum 22 with reciprocating shaft 23 when, or if, the reciprocating shaft is rotating.

Figure 16:
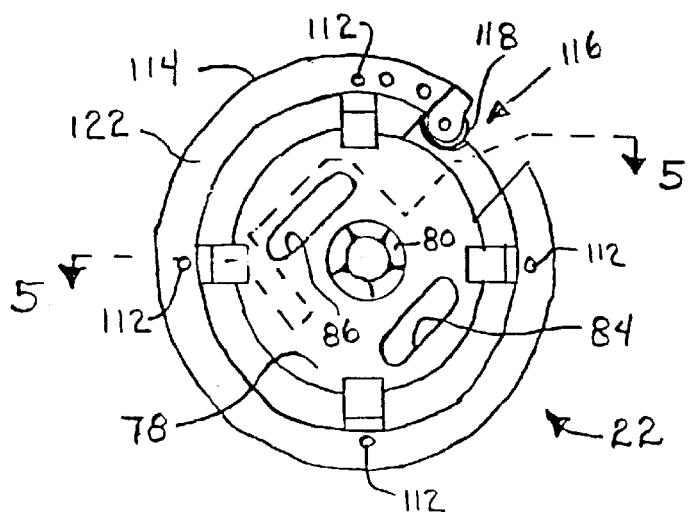
FIG. 16 is an end view of the casing drum of the present invention with the gripper removed.

As best seen in FIGS. 14–16, circumferentially around the casing drum 22 and secured to casing ejector ribs 108, as by screws 112, is a casing ejector ring 114. The casing ejector ring 114 need not be a complete ring, but may be C-shaped with a gap aligned with the open mouth 116 of the casing drum 22 through which the jaws 52, 54 are accessed by the end 48 of the pepperoni stick P. Additionally, a guide, illustrated as roller 118, may be mounted to the casing ejector ring 114 and extend longitudinally rearwardly therefrom alongside the top lip of mouth 116 when the casing ejector 105 is fully reciprocated into the ejection pre-grip position shown in FIGS. 5 and 15. A semi-cylindrical longitudinal recess 120 may be provided on the outer surface of the casing drum 22 so as to allow roller 118 to reciprocate rearwardly with casing ejector ring 114 from the ejection pre-grip position.

The casing ejector 105 preferably includes a contacting portion 122, such as the face of casing ejector ring 114, that reciprocates substantially parallel to the axis 26 of the casing drum 22 from a casing winding position to a first ejector position such as the intermediate position shown in FIGS. 6 and 14, to a second ejector position such as the ejection pre-grip position shown in FIGS. 5 and 15. In moving toward th second ejector position, the contacting portion 122 forcibly and contactingly urges wound casing C longitudinally along the casing drum 22 and expels casing C off of the casing drum 22 as shown in FIG. 15. Advantageously, the wound casing C may be relatively compact and easily managed for disposal relative to the lengthy peeled casings produced under the prior art.

In FIGS. 5 and 15, the reciprocating shaft 23 has been reciprocated forward within the drive shaft 24 toward the casing drum 22 by air cylinder 38 such that jaws 52, 54 are held open by springs 92, 94 and so as to place the casing ring 114 into the ejection pre-grip position, thereby forcing any casing C to slide longitudinally off of the casing drum 22 and into a trash receptacle (not shown). Note that, in this pre-grip position in which the end of the next pepperoni stick is inserted into the open mouth of the casing drum 22 and into the jaws 52, 54. A guide member such as the roller 118 is preferably positioned alongside the open mouth of the casing drum 22 so as to direct the passage of the end of the pepperoni stick into the jaws 52, 54.

In FIGS. 6 and 14, the reciprocating shaft 23 has been partially reciprocated rearwardly by the air cylinder 38 to an intermediate position. The jaws 52, 54 may still be held open by springs 92, 94, but preferably, the guide roller 118 is no longer positioned alongside the open mouth of the casing drum 22.

In FIG. 7, the reciprocating shaft 23 has been fully reciprocated rearwardly by the air cylinder 38 to a gripping position. The rearward reciprocation of the drum rotation disk 78 against jaw actuation member 90 has compressed springs 92, 94, and the jaws 52, 54 are in the fully closed position and are gripping the end 48 of casing C.

Referring to FIGS. 1 and 2, the peeling apparatus 20 further preferably includes a brake 124 for retarding and stopping rotation of the casing drum 22. The brake 124 preferably comprises a caliper brake mechanism including a brake disk 126 mounted to the drive shaft 24 for mutual rotation. The brake 124 allows the reciprocating shaft 23 to reciprocate with respect to the brake disk 126. The brake 124 also may utilize disk pads 128 that are frictionally pressed against the brake disk 126 by calipers 130 so as to retard and stop the rotation of the brake disk 126 and thereby to retard and stop the rotation of the casing drum 22.

A peeling apparatus 20 may include a position detector 132 for detecting the rotational position of the casing drum 22. Accordingly, the mouth 116 may be positioned as shown in FIGS. 1 and 16 for entry of the leading end of the pepperoni casing to be gripped by the gripper 50. The illustrated position detector 132 includes an indexing disk 134 connected to the drive shaft 24 for mutual rotation with both the drive shaft 24 and the casing drum 22. The indexing disk 134 may have a hole or slot 136 at a selected angular position such that a sensor 138, such as an LED sensor, may monitor the slot 136 to sense when the casing drum 22 is at the rotational position in which the mouth 116 is in correct alignment for beginning a peeling cycle.

The peeling apparatus 20 also preferably includes a gripping position sensor, such as a switch 140 actuated by the rearward positioning of the rotational coupling 40 capable of sensing when the ejection means is in a gripping position.

Referring to FIGS. 4 and 17, the peeling apparatus 20 further includes a knife 142 mounted for engaging and longitudinally slitting the casing C of the food stick with a covering, such as the pepperoni stick P, by a sharp blade 144 of the knife 142. If desired, the knife 142 may be spring loaded to exert a known pressure on the casing of the pepperoni stick P, or it may be fixedly adjusted to match the size and casing thickness of the pepperoni stick P. When used in conjunction with a ballooning apparatus 200 as hereinafter described, the knife 142 may be provided with a retractor for retracting knife 142 from casing C until ballooning has been completed, as by clockwise rotating knife 142 about its mounting axis 143 as viewed in FIG. 17.

Referring now to FIGS. 1, 3A, and 3B, the present invention may further include a ballooning means and/or ballooning apparatus 200 for lifting the casing C from the pepperoni stick P prior to peeling the casing C from the pepperoni stick P. As used herein, the term "ballooning" shall be understood to mean the condition of introducing a fluid, preferably air, into an enclosed cavity, such as the interior of the casing C. The introduction of air may be controlled through at least the injected pressure and length of time of introducing air into the casing C. The controlled air introduction may vary according to the given volume of the meat stick so as to create the condition of separating the casing C from the meat kernel therewithin. Because the ballooning may pressurize the interior of the casing C, it is preferred that the ballooning step be performed before the knife 142 penetrates the casing C. Accordingly, the ballooning apparatus 200 is placed upstream of the peeling apparatus 20 so that ballooning may occur prior to peeling.

The pepperoni stick P may be placed between guides 202 and moved longitudinally toward the ballooning apparatus 200. When the pepperoni stick P reaches the proper position for ballooning, a position sensor, such as a switch 204, is actuated and the ballooning cycle begins.

The ballooning apparatus 200 comprises a needle 206 for piercing the casing C of the pepperoni stick P, an insertion device 208 for causing the needle 206 to pierce casing C, and an air supply 210, such as a tank of pressurized air exiting through an air supply control valve 211 interposed within a tube or pipe 212, for forcing pressurized air through needle 206 while casing C is pierced by the needle 206. The insertion device 208 is preferably an air cylinder 214 that causes a ballooning head 216 to move the needle 206 toward and piercingly into casing C when the pepperoni stick P is secured against a guide jig 218.

To use the ballooning and peeling apparatus of the present invention, a pepperoni stick P is placed between guides 202 and moved longitudinally toward the ballooning apparatus 200. When pepperoni stick P reaches the proper position for ballooning, switch 204 is actuated and the ballooning cycle begins. Air is forced through needle 206 into the casing C for a predetermined length of time and at a predetermined pressure, and casing C is ballooningly separated from the encased meat kernel.

The peeling apparatus 20 preferably begins a cycle in the ejection pre-grip position, the casing drum 22 remaining begins a cycle in the home position from the previous cycle, with the brake 124 energized to prevent rotation.

After predetermined delay following the ballooning cycle, the knife 142 may be positioned to slice casing C. The leading end or tab of the casing C may be inserted through the mouth 116 of the casing drum 22, past the roller 118, and into the open jaws of gripping means 50. The air cylinder 38 may then be pressurized to move reciprocating shaft 23 rearwardly to cause drum rotation disk 78 to move jaws 52, 54 into the gripping position and securely grip the leading tab end of cellulose casing C. The brake 124 may then be released to allow rotation of the casing drum 22. When gripping position sensing switch 140 detects that the gripping position has been entered, rotation of the casing drum may begin by applying power to motor 30. As the casing drum 22 rotates, the casing C is wound onto the casing drum 22 as shown in FIG. 17 with the knife 142 creating a longitudinal slit in the casing C so as to allow the casing to be pulled from the pepperoni stick P by the winding force of the casing drum 22 as the peeled pepperoni stick P passes transversely over the casing drum 22. The rotating action of the casing drum 22 applies a strong stressing motion to the casing, thereby pulling it from the pepperoni stick P. After the end of the product is detected by a position sensing switch 204 (or, alternatively, by the detection of the knife 142 position as a result of the casing no longer being sliced thereunder), the cycle termination begins. Rotation continues until the home position is detected by the position detector 132, at which time the brake 124 may be energized to lock the casing drum rotationally in the home position. The air cylinder 38 may be pressurized to move reciprocating shaft 23 into the forward position to cause the holder 50 to release the casing C in the ejection pre-grip position, thereby ejecting the wound casing. C from the casing drum 22 as shown in FIG. 15. The cycle may then be repeated.

In a preferred embodiment, ballooning head 216 presents a convex face to also serve as a guide and promote the relatively even inflation of the casing circumferentially and longitudinally. The sequencing and operation of the present invention including both ballooning and peeling steps may be controlled by a programmable computer or programmable logic controller ("PLC").

The peeling method of the present invention is preferably used in combination with the ballooning method of the present invention by practicing the steps of the ballooning method prior to practicing the peeling method step of winding the casing on the casing drum.

Although the present invention has been described and illustrated with respect to a preferred embodiment and method and a preferred use therefor, it is not to be so limited since modifications and changes can be made therein which are within the full intended scope of the invention.

I claim:

1. A peeling apparatus for peeling the casing from a stick of meat, said peeling apparatus comprising:
   (a) a casing drum mounted for rotation about an axis;
   (b) gripping means for selectively holding a portion of the casing to said casing drum;
   (c) a knife to create a longitudinal incision in the casing;
   (d) means for rotating said casing drum about said axis so as to cause the casing to be removed from the stick of meat by winding the casing upon said casing drum; and
   (e) casing ejector means having an sector with a contacting portion that reciprocates substantially parallel to said axis of said casing drum from a first ejector position to a second ejector position such that said contacting portion contactingly urges the wound casing longitudinally along said casing drum for ejecting the wound casing from said casing drum.

2. A peeling apparatus for peeling the casing from a stick of meat, said peeling apparatus comprising:
   (a) a casing drum mounted for rotation about an axis;
   (b) gripping means for selectively holding a portion of the casing to said casing drum, said gripping means comprising first and second opposed jaws operably coupled to a reciprocating shaft wherein reciprocation of said reciprocating shaft a first predetermined distance causes said first and second opposed jaws to open and close;
   (c) a knife to create a longitudinal incision in the casing;
   (d) means for rotating said casing drum about said axis so as to cause the casing to be removed from the stick of meat by winding the casing upon said casing drum.

3. A peeling apparatus for peeling the casing from a stick of meat, said peeling apparatus comprising:
(a) a casing drum mounted for rotation about an axis;
(b) gripping means for selectively holding a portion of the casing to said casing drum;
(c) a knife to create a longitudinal incision in the casing; and
(d) means for rotating said casing drum about said axis so as to cause the casing to be removed from the stick of meat by winding the casing upon said casing drum;
(e) a position detector sensing at least one rotational position of said casing drum; and
(f) a brake operatively coupled to said casing drum for retarding and stopping rotation of said casing drum.

4. A peeling apparatus for peeling the casing from a stick of meat, said peeling apparatus comprising:
(a) a casing drum mounted for rotation about an axis;
(b) gripping means for selectively holding a portion of the casing to said casing drum;
(c) a knife to create a longitudinal incision in the casing;
(d) means for rotating said casing drum about axis so as to cause the casing to be removed from the stick of meat by winding the casing upon said casing drum;
(e) a needle for piercing the casing; and
(f) an air supply communicating pressurized air to said needle while the casing is pierced by said needle to balloon an enclosed cavity within the casing prior to slicing and peeling the casing surrounding the stick of meat.

5. A casing ballooning apparatus for lifting the casing from a stick of meat prior to peeling the casing from the stick of meat, said ballooning apparatus comprising:
(a) a needle for piercing the casing;
(b) means for causing said needle to move into contact with and to pierce the casing and to retract away from the casing; and
(c) an air supply connected to the needle for forcing air through said needle while the casing is pierced by said needle to balloon the casing prior to slicing and peeling the casing from the stick of meat.

6. A peeling apparatus for peeling the casing from a stick of meat, said peeling apparatus comprising:
(a) a casing drum mounted for rotation about an axis;
(b) a casing holder operatively coupled to said casing drum;
(c) a drive shaft operatively coupled to the casing drum capable of rotating said casing drum about said axis;
(d) a casing ejector moveable across an exterior portion of said casing drum; and
(e) a reciprocating shaft operatively coupled to the ejector.

7. The peeling apparatus as recited in claim 6, which said peeling apparatus further comprises:
(a) a position detector to sense at least one rotational position of said casing drum; and
(b) a brake operatively coupled to the drive shaft capable of retarding and stopping rotation of said casing drum.

8. The peeling apparatus as recited in claim 6 further comprising a casing ballooning apparatus having:
(a) a needle for piercing the casing; and
(b) air supply means for forcing air through said needle while the casing is pierced by said needle.

9. The peeling apparatus of claim 6 wherein the casing holder comprises first and second opposed jaws and reciprocation of the reciprocating shaft between a first and a second position moves the opposed jaws between the open and closed positions.

10. The peeling apparatus of claim 6 further comprising a guide to direct the casing to the holder.

11. A method of peeling a casing from a stick of meat, with a casing drum mounted for rotation about an axis said peeling method comprising the steps of:
(a) gripping a portion of the casing to said casing drum with the casing drum at a home position to begin a cycle;
(b) making a longitudinal cut in the casing;
(c) winding the casing on said casing drum by rotating said casing drum with respect to the stick of meat; and
(d) completing the cycle by stopping the casing drum.

12. The peeling method as recited in claim 11, additionally comprising the steps of beginning each peeling of casing by having said casing drum at a certain home rotational position; and ending each peeling of casing by stopping rotation of said casing drum at said certain home rotational position.

13. The peeling method as recited in claim 11 further comprising the steps of:
(a) piercing the casing with a needle; and
(b) forcing air through said needle into an enclosed cavity within the casing while the casing is pierced by said needle prior to said step of making a longitudinal cut in the casing.

14. A method of peeling a casing from a stick of meat, with a casing drum mounted for rotation about an axis said peeling method comprising the steps of:
(a) gripping a portion of the casing to said casing drum;
(b) making a longitudinal cut in the casing;
(c) winding the casing on said casing drum by rotating said casing drum with respect to the stick of meat; and
(d) ejecting the wound casing from said casing drum.

15. The peeling method as recited in claim 14 wherein the ejected wound casing is at least partially compacted.

16. A method of peeling a casing from a stick of meat, with a casing drum mounted for rotation about an axis said peeling method comprising the steps of:
(a) gripping a portion of the casing to said casing drum;
(b) making a longitudinal cut in the casing;
(c) winding the casing on said casing drip by rotating said casing drum with respect to the stick of meat; and
(d) ejecting the wound casing from said casing drum by longitudinal movement of a contacting portion of an ejector urging said casing off the drum.

17. A peeling apparatus for peeling the casing from a stick of meat, said peeling apparatus comprising:
(a) a casing drum mounted for rotation about an axis;
(b) a casing holder operatively coupled to said casing drum;
(c) a drive shaft operatively coupled to the casing drum capable of rotating said casing drum about said axis;
(d) a casing ejector moveable across an exterior portion of said casing drum;
(e) a reciprocating shaft operatively coupled to the ejector; and
(f) a knife to create a longitudinal incision in the casing.

18. The peeling apparatus as recited in claim 17, in which said peeling apparatus further comprises:
(a) a position detector to sense at least one rotational position of said casing drum; and (b) a brake operatively coupled to the drive shaft capable of retarding and stopping rotation of said casing drum.

19. The peeling apparatus as recited in claim 17 further comprising a casing ballooning apparatus having:
   (a) a needle for piercing the casing; and
   (b) air supply means for forcing air through said needle while the casing is pierced by said needle.

20. The peeling apparatus of claim 17 further comprising at least one detector; and a computer communicating with the detector and controlling the grip and release of the holder.

21. A peeling apparatus for peeling the casing from a stick of meat, said peeling apparatus comprising:

(a) a casing drum mounted for rotation about an axis;
(b) gripping means for selectively holding a portion of the casing to said casing drum, said gripping means operable at a stationary home position;
(c) a knife to create a longitudinal incision in the casing; and
(d) means for rotating said casing drum about said axis through a cycle so as to cause the casing to be removed from the stick of meat by winding the casing upon said casing drum.

* * * * *